United States Patent
Wing et al.

(10) Patent No.: US 7,627,290 B2
(45) Date of Patent: Dec. 1, 2009

(54) ROUTE CONVERGENCE MONITORING SYSTEM AND METHOD

(75) Inventors: Daniel G. Wing, San Jose, CA (US); Jagannathan Shiva Shankar, Vijayanagar (IN); Tarun Marhwal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 695 days.

(21) Appl. No.: 11/176,631

(22) Filed: Jul. 7, 2005

(65) Prior Publication Data
US 2007/0008953 A1    Jan. 11, 2007

(51) Int. Cl.
H04B 17/00    (2006.01)

(52) U.S. Cl. ............... 455/67.13; 455/67.11; 455/445; 455/68; 455/69; 370/231; 370/235; 370/236; 370/237; 370/238; 370/248; 370/252; 370/351; 370/400; 370/408; 709/238; 709/239; 709/242; 709/244

(58) Field of Classification Search .............. 455/445, 455/41.2, 67.11, 67.13, 67.14, 68–69; 370/221–222, 370/231–236, 236.1–2, 237–238, 238.1, 370/248, 252–253, 395.31–32, 400–401, 370/408, 410, 351; 709/238–244, 203
See application file for complete search history.

(56) References Cited

U.S. PATENT DOCUMENTS

| | | | | |
|---|---|---|---|---|
| 5,898,673 A | * | 4/1999 | Riggan et al. | 370/237 |
| 5,933,425 A | * | 8/1999 | Iwata | 370/351 |
| 6,064,653 A | * | 5/2000 | Farris | 370/237 |
| 6,359,976 B1 | | 3/2002 | Kalyanpur et al. | |
| 6,449,259 B1 | * | 9/2002 | Allain et al. | 370/253 |
| 7,007,102 B2 | * | 2/2006 | Billhartz et al. | 709/238 |
| 7,218,895 B1 | * | 5/2007 | Raghavan | 455/67.13 |
| 7,219,124 B2 | * | 5/2007 | Cerami et al. | 709/203 |

* cited by examiner

Primary Examiner—Tuan A Tran
(74) Attorney, Agent, or Firm—Trellis IP Law Group, PC

(57) ABSTRACT

A route convergence monitoring system and method provide for determining routing changes or affected devices that may cause detrimental or other quality conditions to occur in an endpoint device. In one embodiment, ongoing endpoint quality monitoring of quality conditions and convergence occurrence monitoring of successive route changes that may occur are initiated. An endpoint quality monitor provides for determining an endpoint quality condition and transferring an indicator of the condition (e.g., endpoint device and timing) to a network manager. The network manager may add one or more information indicators and provides the indicators to an end-to-end convergence monitor. The convergence monitor, receives the indicators and determines one or more of a second endpoint device, routing changes in at least a portion of the network and a correlation of routing changes that may have caused the indicated or other quality conditions to occur.

20 Claims, 7 Drawing Sheets

ROUTE CONVERGENCE MONITORING SYSTEM AND METHOD

BACKGROUND OF THE INVENTION

1. Field of Invention

The present invention relates in general to the field of computer networks and more specifically to computer networks including optical communication couplings.

2. Description of the Background Art

While networks are becoming increasingly reliable, a device fault may nevertheless occur at various times during an ongoing user interaction, causing at least a portion of the network to re-configure. As a result, data may be delayed, un-transmitted or lost entirely, adversely affecting the quality of the user interaction. Most re-configuration mechanisms, for example, include each affected network device selecting an active branch for causing the affected network portion to converge on a loop-less configuration. It will be appreciated that such selection takes a finite amount of time to complete, after which modern networks may re-transmit information that is determined to have been dropped due to the fault.

Until very recently, it was commonly assumed that conventional network convergence mechanisms were not only sufficiently robust to provide for email, file transfers and other non-real-time transmission to which data networks were initially directed. It was further presumed that existing convergence mechanisms would be sufficient for IP telephony, video delivery, live interaction and other more modern real-time applications using more modern data or so-called hybrid networks. Unfortunately, that assumption appears highly inaccurate. One recent study, for example, determined that "unlike switches in the public telephony network which exhibit failover on the order of milliseconds . . . interdomain routers in the packet switched Internet may take tens of minutes to reach a consistent . . . network topology after a fault" (Craig Lebowitz et. Al, "Delayed Internet Routing Convergence", Microsoft Research and the University of Michigan). Thus, while perhaps satisfactory for non-real-time applications, convergence delays may well result in unacceptable errors in more real-time applications.

In an IP telephony application conducted via a packet switching network, for example, dropped, mis-ordered, re-received, re-configured or other errors may cause delays, gaps, echo or other sources of poor quality-of-voice (QoV). To make matters more difficult, conventional mechanisms merely provide for conducting single endpoint K-factor, E-model or other determinations of low endpoint QoV, and none has heretofore considered, let alone provided for attempting to determining causes of low quality telephony or other real-time applications. The above study, while groundbreaking, merely provided for causing errors to be experimentally generated and results to be received in a controlled manner uncharacteristic of an operating network.

Accordingly, there is a need for route convergence monitoring system and method that enable one or more of the above and/or other problems of conventional mechanisms to be avoided.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain or store the computer program for use by or in connection with the instruction execution system, apparatus, system or device. The computer readable medium can be, by way of example only but not by limitation, a semiconductor system, apparatus, system, device, or computer memory. The computer readable medium may have suitable instructions for providing for input or presenting in accordance with various embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for providing for input or presenting in accordance with various embodiments of the present invention.

Figure 1A:
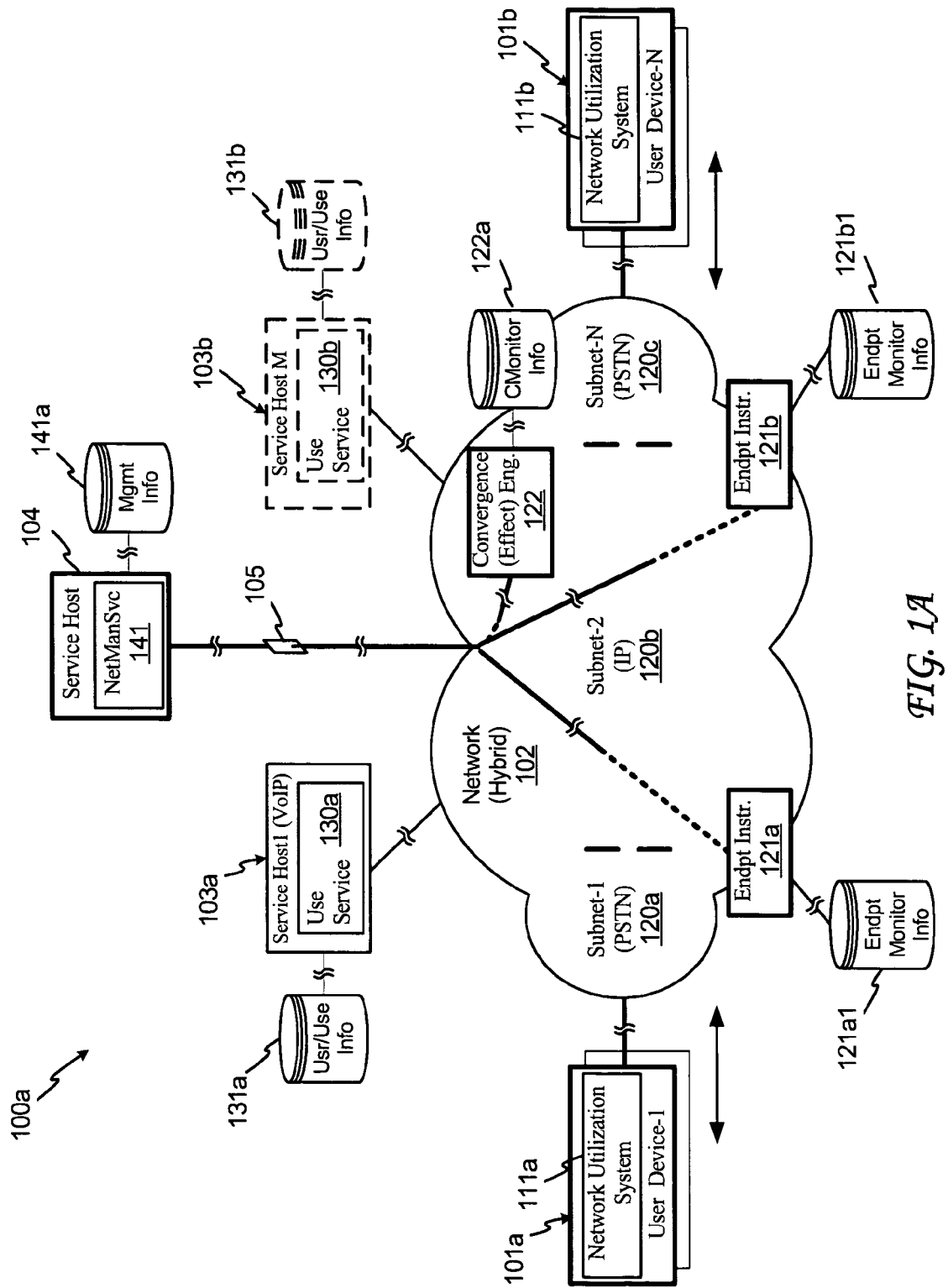
FIG. 1a is a flow diagram illustrating a convergence monitoring enabled network system according to an embodiment of the invention.

Referring now to FIG. 1A, there is seen a flow diagram illustrating a convergence monitoring enabled network system (monitored network) according to an embodiment of the invention. Monitored network 100a broadly provides for conducting otherwise substantially unfettered conventional network utilization in conjunction with network convergence monitoring as discussed herein. Monitored network 100a more specifically includes a singular or composite (e.g., hybrid, multi-domain, and so on) network that provides an infrastructure for substantially real-time, semi-real-time or non-real-time applications. Such applications may be hosted by one or more of monitored network hosts or other components, user devices or some combination. Monitored network 100a further provides for monitoring network convergence that may occur in at least a portion of network look. Such convergence monitoring may, for example, include ongoing end-to-end time monitoring of convergence occurrences generally or with regard to particular applications, devices, and so on, or some combination thereof. Convergence monitoring may also include correlation of such occurrences or cause-and-effect characteristics thereof with adversely impacted quality-of-use.

Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise. The term "multiple" as used herein is intended to include "two or more" unless otherwise indicated or the context clearly indicates otherwise.

As shown in FIG. 1A, a monitored network look in one embodiment comprises at least intermittently communicatingly couplable components including user devices 101a-b, network 102, one or more application service host(s) 103a-b and network management service host (network manager) 104. Within monitored network 100a, user devices 101a-b include network utilization system 111a-b. Network 102 further includes one or more endpoint quality monitoring instruments (endpoint quality monitors) 121a-b and end-to-end convergence monitoring engines (convergence monitors) 122. Application service hosts 103a-b may each include one or more application, access or other use service(s) 130a-b, and network manager 104 includes network management service 141. Monitored network 100a may also include one or more storage devices, e.g., 122, 131a, 131b, 141a for storing convergence monitoring, application, management or other information or some combination thereof, and may include various security mechanisms (which are generally indicated by firewall 105).

User devices 1 through N 101a-b generally provide network access and application participation mechanisms with which one or more users may participate in one or more applications, at least a portion of which may be conducted via network 102a. User devices 101a-b may therefore include any device or devices that are capable of providing at least intermittent communication coupling to network 102 and enabling a user to participate in a current application. Examples of user devices generally include but are not limited to one or more of personal computers (PCs), portable computers, smart phones, PDAs, network devices, game consoles, network/multimedia distribution points, and so on, or some combination, in accordance with the requirements of a particular application. It will further become apparent that higher quality user experiences in conducting applications are desirable. Therefore, the quality of the user experience may also be monitored by system look as was noted earlier. Embodiments of the invention, however, enable user devices to be utilized in an otherwise substantially unfettered. conventional manner or otherwise in accordance with the requirements of a particular implementation.

In a more specific embodiment, user devices 101a-b may include telephony-enabled devices (telephony devices) for enabling users/devices to initiate or otherwise participate in a phone call via network 102. Such devices may, for example, include but are not limited to conventional, cellular, satellite or internet protocol (IP) phones, appliances, PCs, multi-function or so-called smart devices, and so on, or some combination thereof. The aforementioned quality monitoring may therefore include detrimental impact on the quality of voice (QoV) that may be provided to one or more users of user devices 101a-b in conjunction with telephony or other applications.

The remainder of the discussion will focus primarily on a two-user telephony application as a consistent example from which the invention may be better understood. Such application may, for example, include one user initiating an IP-phone call via user device 101a, the other user receiving and accepting the call via user device 101b and the users proceeding with the call-in-progress. Each may further be conducted in an otherwise conventional manner, via respective ones of user devices 101a-b. Such application is not, however, intended to be limiting. Rather, it will become apparent that embodiments of the invention are also applicable to other real-time or end-to-end applications, as well as to semi-real-time, non-real-time or combined applications in conjunction with a variety of numbers or types of devices, users, information (e.g., media), and so on, that may be applicable in a given instance.

Within user devices 101a-b, network utilization system 111a-b may include program code or other information (e.g., user, phone number, preferences, and so on) for coupling respective ones of user devices 101a-b to network 102, and for initiating, accepting or otherwise participating in the aforementioned telephony application (or other application or applications). Network utilization systems 111a-b may, for example, include an Internet or other network browser for coupling to a telephony application service host, e.g., 103a, which service host may conduct the call initiation, response or call-in-progress, provide downloadable or otherwise mobally executable code (e.g., Java) or both. Alternatively or in combination therewith, network utilization systems 111a-b may store conventional or other program code for one or more of coupling to network 102, initiating/responding to a call or conducting a call-in-progress, which call may be routed, in conjunction with service host 103a operation or not, via network 102.

Network utilization system 111a-b in another embodiment may further include program code or other information for affecting the manner in which monitoring may be conducted or that a user may participate in providing quality information, among other examples. (A service host may also provide for collecting billing information or performing other support or further operations in accordance with the requirements of a particular implementation.)

Network 102 provides for coupling and routing information between (or among) user devices in conjunction with a telephony (or other) application and may be operable in an otherwise conventional manner that is not incompatible with the discussion herein. Network 102 may, for example, include a static or reconfigurable wired/wireless local area network (LAN), wide are network (WAN), such as the Internet, private network, and so on, or some combination. Network 102 may also include a singular network (e.g., a single domain data network) or a composite network that may, for example, include a multiple domain hybrid network. A hybrid network may, for example, include one or more public switched telephone networks (PSTN) 120a, 120c that may be more immediately coupled to one or both users and one or more data networks 120b that may be coupled to the PSTN (e.g., see also FIG. 2). ATM, POTS, PBX and so on, or some combination may also be used. Such an arrangement may, for example, be used to reduce user telephone (or facsimile, video, other media, other or combined) costs by directing calls to/from a PSTN via an intermediary data network (e.g., see FIG. 1A). For clarity sake, such potential network sub-divisions will also be referred to herein as sub-networks that may comprise an overall network, such as network 102. Sub-networks may also refer to other network sub-divisions that may, for example, be managed by one or more entities or conducted as separate domains.

Within network 102, one or more endpoint quality monitors 121a-b provide for monitoring the quality of application media delivered to a user device (endpoint quality) corresponding to the endpoint monitor. In the above telephony application embodiment, for example, endpoint quality monitor 121a may provide for monitoring the voice quality delivered to user device-1 101a during a call-in-progress. In other embodiments, one or more other endpoint quality monitors (e.g., 121b) may also monitor the QoV of respective ones of other user devices (e.g., user device-N 111b) alone or in conjunction with one another. It will be appreciated that a single endpoint quality monitor may provide for monitoring endpoint quality corresponding to respective ones of more than one user device in a network portion. An endpoint quality monitor may further be positioned for monitoring substantially all calls (or other applications) in conjunction with a particular sub-network.

Each endpoint quality monitor may use the same or different conventional, other or combined quality detection mechanisms for conducting endpoint quality monitoring. Quality detection mechanisms that are useable in conjunction with telephony applications may, for example, include but are not limited to one or more of so-called K-factor, E-model or other mechanisms espoused by the International Telecommunication Union (ITU), or some combination. (See, for example, http://www.itu.int/home/index.html). These or other quality detection mechanisms may also be used in conjunction with other applications that may employ single or multiple media streams or other single or multiple data types (hereinafter referred to as multimedia or multimedia data). Quality detection mechanisms may also utilize wholly objective, subjective (e.g., user, user device, trusted third party, and so on) or combined quality characteristics that may further employ absolute, relative, delta or other quality detection. Quality criteria also may or may not be limited to particular multimedia that may be receivable or enabled by a particular user device (e.g., by receiving or otherwise detecting user device characteristics), among other examples.

Endpoint quality monitors 121a-b in one embodiment also provide for initiating end-to-end convergence monitoring, wherein determination of a call route, convergence occurrence(s), actual/potential cause or other monitoring operations may be conducted. Such monitoring is more preferably conducted by a convergence monitor, for example, as is discussed below. In a more specific embodiment, the endpoint quality monitor causes end-to-end monitoring initiation responsive to detecting a quality condition (e.g., a detrimental quality change, level or other quality defect). The quality condition for a telephony application may, for example, correspond with an ETR250 (ITU) overall rating factor (R-factor), quality factors, such as noise or signal to noise ration, impairments, effect on user expectation, and so on, or some combination thereof. The quality condition may also correspond with one or more of detected jitter, delay, echo, broken or mis-ordered conversation, front-end clipping or any other detectable characteristics or other conditions. (See, for example, ITU recommendations G.113 and G114.) It will be appreciated that the same or other standardized, custom or combined quality or other condition criteria may also apply in conjunction with telephony or other applications employing various multimedia data, device types, and so on, or some combination thereof.

In another embodiment, endpoint quality monitor 121a retrieves predetermined monitoring criteria from endpoint monitor information storage 121a1, user device-1 110a, service host 103, NMS 104 or some combination. Monitoring criteria may, for example, include one or more of monitoring characteristics/algorithms, device sets, user preferences, device characteristics, and so on, and may support static or variable quality monitoring.

In a more specific embodiment, endpoint monitor 121a initiates end-to-end monitoring on a per-occurrence quality reduction basis by transferring a quality defect occurrence indicator to network manager 104. In other embodiments, such initiation may be conducted on one or more of a per-occurrence, traffic level, severity, priority, scheduling or other bases or some combination thereof. The quality defect occurrence indicator in one embodiment includes an occurrence indicator, an affected device indicator and an occurrence time indicator indicating respectively that a defect (or a particular type defect) was detected with regard to a particular device at a particular absolute or relative time. The affected device indicator may, for example, include an IP address of an affected device. Network manager (NMS) 104 may further initiate a corresponding convergence monitor 122 in conjunction with receipt of the indicator, or according to one or more of a per-occurrence or number of occurrences, traffic level, severity, priority, scheduling or other basis, or some combination in accordance with the requirements of a particular implementation. In other embodiments, a timing indicator may be provided by service host 103, network manager 104, or service host 103 and network manager 104 may be implemented in a combined or otherwise integrated manner (e.g., see below).

It should be noted that ones of the above embodiments enable advantages including the use of a singular "maintenance reporting" endpoint monitor interface to a primary or corresponding management system. They further provide support for monitoring implementations ranging from simpler and less expensive to highly flexible and robust, among still further advantages.

Convergence monitor 122 provides for conducting ongoing convergence occurrence monitoring, and for responding to initiation by performing further monitoring operations that may include but are not limited to routing, cause-and-effect correlation, and so on or some combination thereof (hereinafter, correlation monitoring). Ongoing monitoring in one embodiment includes convergence monitor 122 monitoring network status messages indicating the routing changes of network devices or device couplings, and storing therefrom respective convergence indicators of changes occurring at different times. Convergence monitor 122 may, for example, form a routing table as a topological database including initial routing and successive routing changes that may occur at various times. Each convergence indicator may, for example, include a routing snapshot indicating a convergence occurrence indicator, routing indicators and a timing indicator respectively indicating that a network portion re-routing (convergence) occurred, the routing changes or resulting routing, corresponding network devices and an absolute or relative timing of the convergence.

Initiated or correlation monitoring operations in one embodiment includes identifying, via a routing table, a second (hereinafter, receiving) user device corresponding to the first (hereinafter, initiating or endpoint monitored) device indicated by the endpoint quality monitor indicator. Correlation monitoring in another embodiment includes determining a route from the initiating device to the receiving device, determining changes corresponding to that route, or further, a received time indicator, and determining routing changes or affected network devices that may have caused one or more quality deficiencies or indicated quality deficiencies.

Convergence monitor 122 in one embodiment provides for receiving from storage 122 convergence monitoring information according to which static or variable monitoring operations may be conducted. Such information may, for example, include but is not limited to one or more of interacting device/path detection criteria, correlation criteria/procedures, monitored devices, preferences and so on in accordance with the requirements of a particular implementation.

In a-more specific embodiment, convergence monitor 122 may include one or more passive intra-domain or inter-domain routers. Unlike conventional active routers, passive routers may not only plug into substantially any routing environment protocol; passive routers further receive but do not advertise routes or route updates. They are therefore capable of using received routing status information indicative of network portion convergence without substantially affecting network routing. In the present embodiment, passive routers may also be used to determine routing table updates and storing routing update indicators indicating the routing table updates. Passive routers may further be use to maintain a time or delta time timing indicator (e.g., according to a localized, network or other clock reference), to form timestamps corresponding to the timing indicators and to associate the timestamps with the routing updates. (It will be appreciated, however, that one or more other devices or some combination may also be used.) Examples of suitable routing environment protocols may include but are not limited to one or more of open shortest path first (OSPF), border gateway protocol (BGP) and system-to-intermediate system protocol (IS-IS). Examples of passive routers may, for example, include but are not limited to certain Cisco Systems models.

Network manager 104 in one embodiment includes a suitable, e.g., conventional, service host, and provides for initiating endpoint quality monitors 121a, 121b and convergence monitor 122 ongoing monitoring. Network manager 104 also provides for initiating and providing convergence indicators to convergence monitor 122 for performing routing and correlation monitoring. In another embodiment, network manager 104 is implemented as an application, e.g., telephony, service host, such as VoIP service host 103a.

As discussed, network manager 104 may receive quality indicators from endpoint quality monitors 121a, 121b and provide corresponding convergence indicators to convergence monitor 122 in a substantially concurrent, scheduled or otherwise delayed manner. Network manager 104 may, for example, receive one or more of interfacing, initiating, scheduling and other information from management information storage 141a. Network manager may further generate a timing indicator, for example, in embodiments in which a timing indicator is not provided by an endpoint quality monitor.

Firewall 105 is illustrative of a wide variety of security mechanisms, such as firewalls, encryption, fire zone, compression, secure connections, and so on, one or more of which may be used in conjunction with various system 100 components. Many such mechanisms are well known in the computer and networking arts and may be utilized in accordance with the requirements of a particular implementation.

Operationally, network manager 104 in one embodiment initializes endpoint quality monitors 121a, 121b and one or more convergence monitors 122 in conjunction with network 102 configuration. Network manager 104 may further initialize other network management services in accordance with the requirements of a particular implementation. In other embodiments, various devices may self-initialize in accordance with information stored in respective device or shared storage media, or some combination may be utilized. Thereafter, endpoint quality monitors 121a, 121b and convergence monitors 122 may continue ongoing monitoring unless halted by the occurrence of a fault or halting or operation modifying control operation by network manager 104.

A telephony (or other) application may be initiated in an otherwise conventional manner. For example, a user may explicitly initiate user device 121a connection via a network access supplier (e.g., Internet service provider or ISP) 130b to a data or hybrid network. The user may then initiate a call via network utilization system 111a, e.g., a web browser or telephony application, which call may be effectuated by a voice over IP (VoIP) service host 103a. Alternatively, user initiation of a call may provide for network access, call initiation and so on. Other suitable mechanisms or some combination may also be used in accordance with the requirements of a particular implementation (e.g., see above).

VoIP service host 103a or network manager 104 may further initiate one or more of endpoint quality monitors 121a, 121b for monitoring and reporting occurrences of one or more predetermined QoV (or other) conditions to network manager 104, e.g., by providing a user device or connection indicator. In another embodiment, endpoint quality monitors 121a, 121b may provide for automatic detection of an initiated call or call-in-progress, or some combination may be used. Convergence monitor(s) 122 may similarly operate in a wholly autonomous manner for conducting ongoing convergence monitoring or may be operable subject to halting, continuing or other operational modification by network manager 104 or some other device, or some combination may be utilized.

Endpoint quality monitors 121a, 121b are further operable in one embodiment for monitoring the endpoint quality of voice (QoV), and for reporting predetermined QoV conditions to network manager 104, e.g., as was already discussed. Network manager 104 may further initiate monitoring correlation by convergence effect engine(s) 122, which may perform such correlation monitoring and return to network manager 104, service host 103 or both, one or more predetermined correlation monitoring results. Network manager 104 may also provide for automatic or other reporting of one or more of QoV, convergence correlation monitoring results. It will be appreciated that the above system 100a operations may be conducted in a similar manner, or otherwise in accordance with the requirements of a particular implementation, or in conjunction with other applications or multimedia information.

Figure 1B:
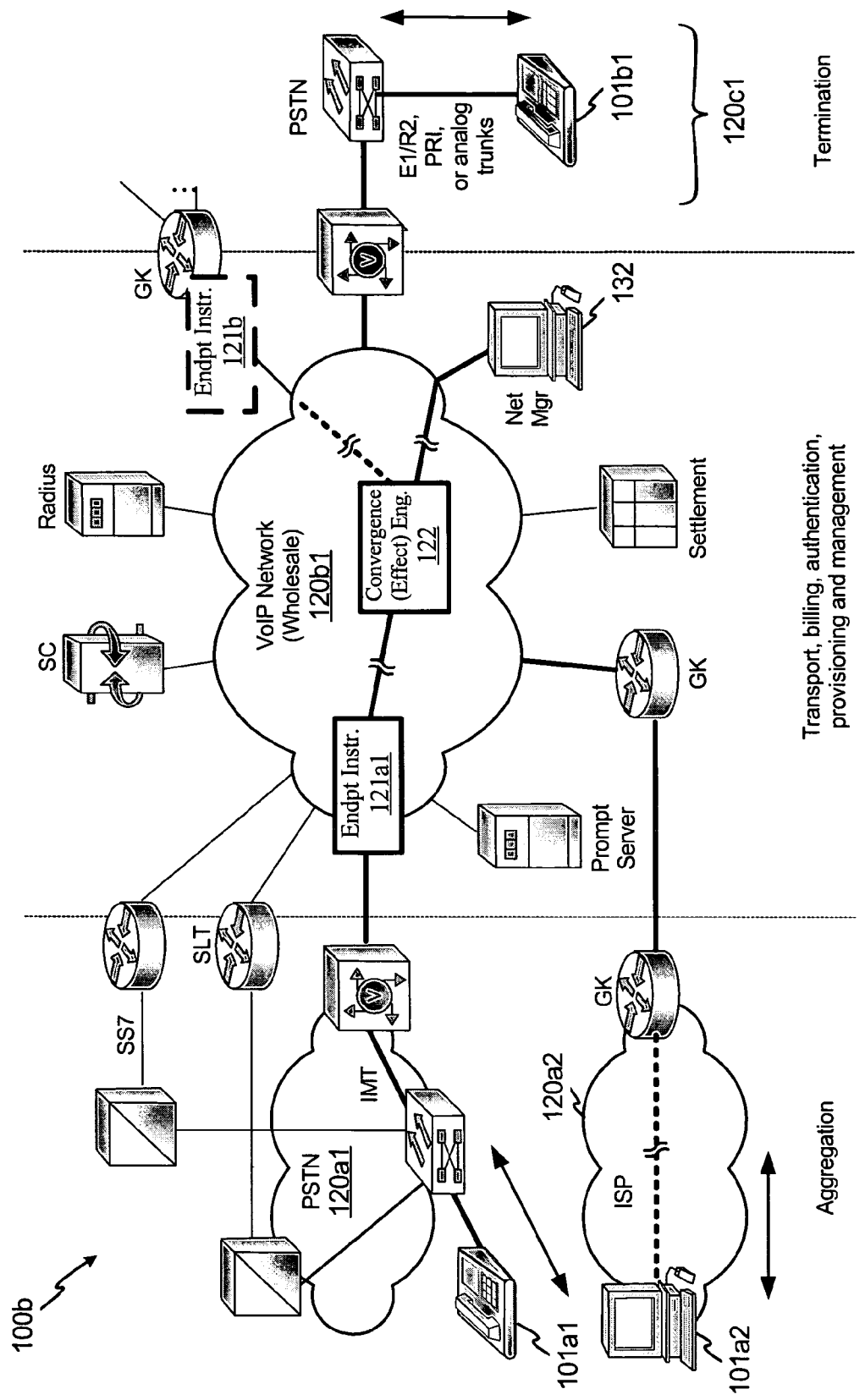
FIG. 1b is a flow diagram illustrating another monitoring enabled network system according to an embodiment of the invention.

The FIG. 1B flow diagram illustrates a further, more specific convergence monitoring enabled network system (monitored network) 100b according to an embodiment of the invention. In this embodiment, a voice-and-data hybrid multi-domain network 120a1, 120b1, 120c1 is provided in which all quality and convergence monitoring (i.e., and correlation) is conducted in conjunction with data network 102b1. In other embodiments, QoV (or other quality criteria) may also be monitored in other sub-networks or domains, for example, to provide complete end-to-end monitoring despite any data conversion or change representational change that may be conducted (e.g., analog-to/from-digital, different formatting, and so on). When performed in a multiple-domain or other multiple sub-network manner, monitoring may be conducted in a more distributed or centralized manner. For example, one or more network managers may be used, ongoing monitoring may be initiated in an intra or inter domain manner, information may be collected upon occurrence, request or otherwise, and so on, or some combination may be used, in accordance with the requirements of a particular implementation.

The present embodiment also illustrates how an analog or digital call (or other multimedia application) initiation may be received from conventional, cellular, IP-phone or multimedia phone 101a1 or PC 101a2 type user devices coupled to sub-network 120a1. Call content may further be transmitted via one or more digital sub-networks 120b1 and delivered via sub-network 120c1 by one or more of a similarly diverse set of user devices or visa versa. (It will be appreciated that one or more other devices or some combination of devices may also be used.) As is also shown, one or more sub-networks may be managed by different service providers. For example, a communication company may provide for transmission of call content via PSTN 120a1, after which the call content may be transmitted at substantially lower cost via the Internet or some other data network by a wholesale transmission supplier and delivered to a recipient either directly (e.g., to a PC, PDA or IP phone, game console, and so on) or via a further PSTN (e.g., to a conventional, cellular or satellite phone, and so on).

Figure 2:
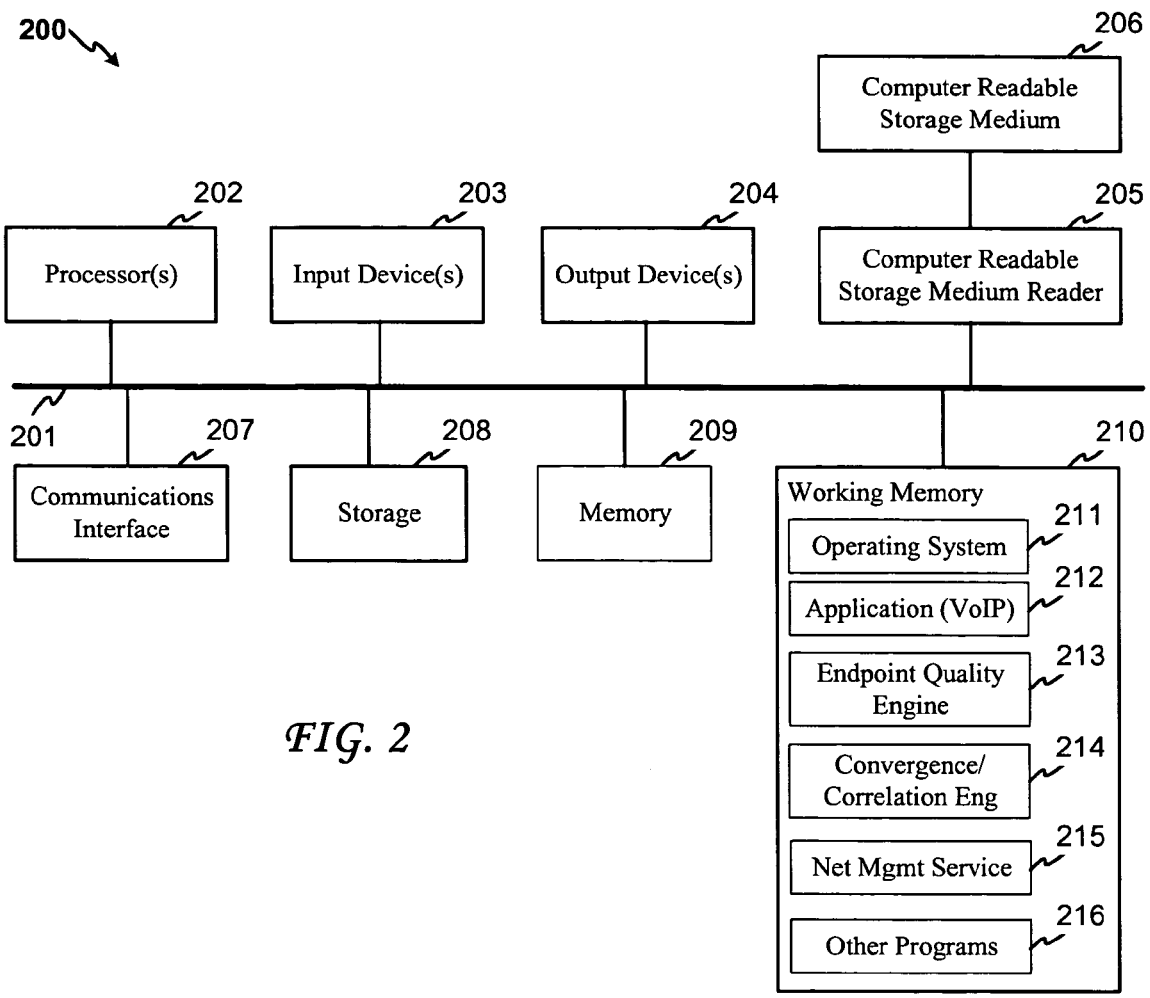
FIG. 2 is a schematic diagram illustrating an exemplary computing system including one or more of the monitoring enabled network system components of FIGS. 1a through 1b, according to an embodiment of the invention.

The FIG. 2 flow diagram illustrates a computing system embodiment that may comprise one or more of the components of FIGS. 1A and 1B. While other alternatives might be utilized or some combination, it will be presumed for clarity sake that components of systems 100a and 100b and elsewhere herein are implemented in hardware, software or some combination by one or more computing systems consistent therewith, unless otherwise indicated or the context clearly indicates otherwise.

Computing system 200 comprises components coupled via one or more communication channels (e.g. bus 201) including one or more general or special purpose processors 202, such as a Pentium®, Centrino®, Power PC®, digital signal processor ("DSP"), and so on. System 200 components also include one or more input devices 203 (such as a mouse, keyboard, microphone, pen, and so on), and one or more output devices 204, such as a suitable display, speakers, actuators, and so on, in accordance with a particular application.

System 200 also includes a computer readable storage media reader 205 coupled to a computer readable storage medium 206, such as a storage/memory device or hard or removable storage/memory media; such devices or media are further indicated separately as storage 208 and memory 209, which may include hard disk variants, floppy/compact disk variants, digital versatile disk ("DVD") variants, smart cards, partially or fully hardened removable media, read only memory, random access memory, cache memory, and so on, in accordance with the requirements of a particular implementation. One or more suitable communication interfaces 207 may also be included, such as a modem, DSL, infrared, RF or other suitable transceiver, and so on for providing inter-device communication directly or via one or more suitable private or public networks or other components that can include but are not limited to those already discussed.

Working memory 210 further includes operating system ("OS") 211, and may include one or more of the remaining illustrated components in accordance with one or more of a particular device, examples provided herein for illustrative purposes, or the requirements of a particular application. Monitoring enabled network components may, for example, include one or more application portions 212, such as for conducting VoIP, one or more endpoint quality engines 213, e.g., for conducting endpoint quality monitoring, one or more convergence/correlation engines 214, e.g., for conducting end-to-end convergence or correlation monitoring, and one or more network management services 215, e.g., for initiating or reporting quality, convergence or correlation monitoring results. Working memory of one or more devices may also include other program(s) 216, which may similarly be stored or loaded therein during use.

The particular OS may vary in accordance with a particular device, features or other aspects in accordance with a particular application, e.g., using Windows, WindowsCE, Mac, Linux, Unix, a proprietary OS, and so on. Various programming languages or other tools may also be utilized, such as those compatible with C variants (e.g., C++, C#), the Java 2 Platform, Enterprise Edition ("J2EE") or other programming languages. Such working memory components may, for example, include one or more of applications, add-ons, applets, servlets, custom software and so on for conducting but not limited to the examples discussed elsewhere herein. Other programs 216 may, for example, include one or more of security, compression, synchronization, backup systems, groupware, networking, or browsing code, and so on, including but not limited to those discussed elsewhere herein.

When implemented in software, one or more of system 100a and 100b or other components may be communicated transitionally or more persistently from local or remote storage to memory (SRAM, cache memory, etc.) for execution, or another suitable mechanism may be utilized, and one or more component portions may be implemented in compiled or interpretive form. Input, intermediate or resulting data or functional elements may further reside more transitionally or more persistently in a storage media, cache or other volatile or non-volatile memory, (e.g., storage device 208 or memory 209) in accordance with the requirements of a particular application.

Figure 3A:
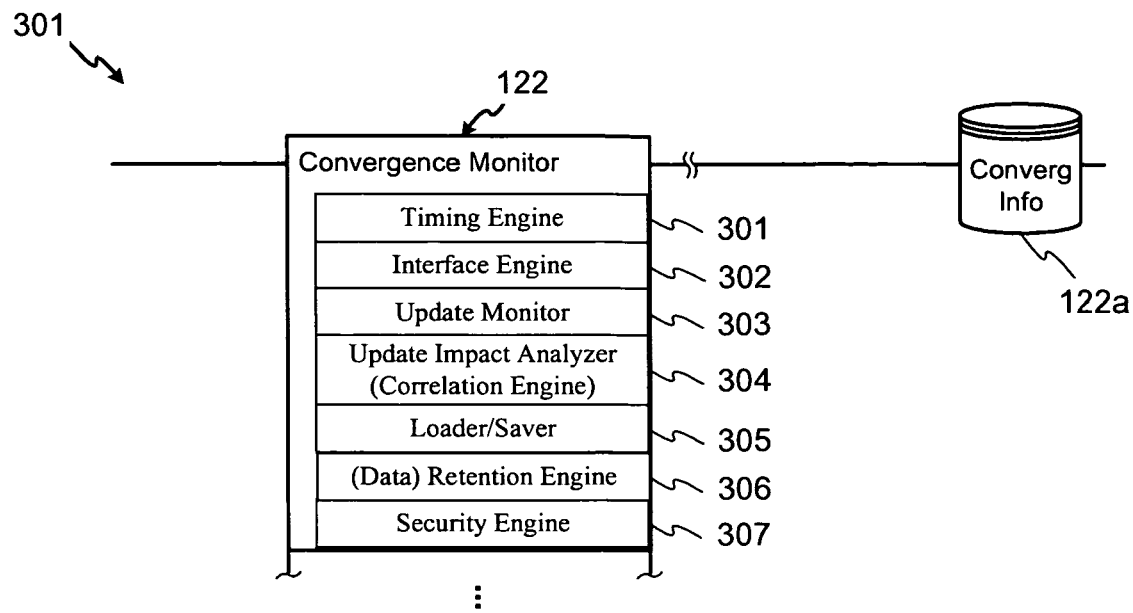
FIG. 3a is a flow diagram illustrating, in greater detail, an example of a convergence engine of FIGS. 1a and 1b, according to an embodiment of the invention.
Figure 3B:
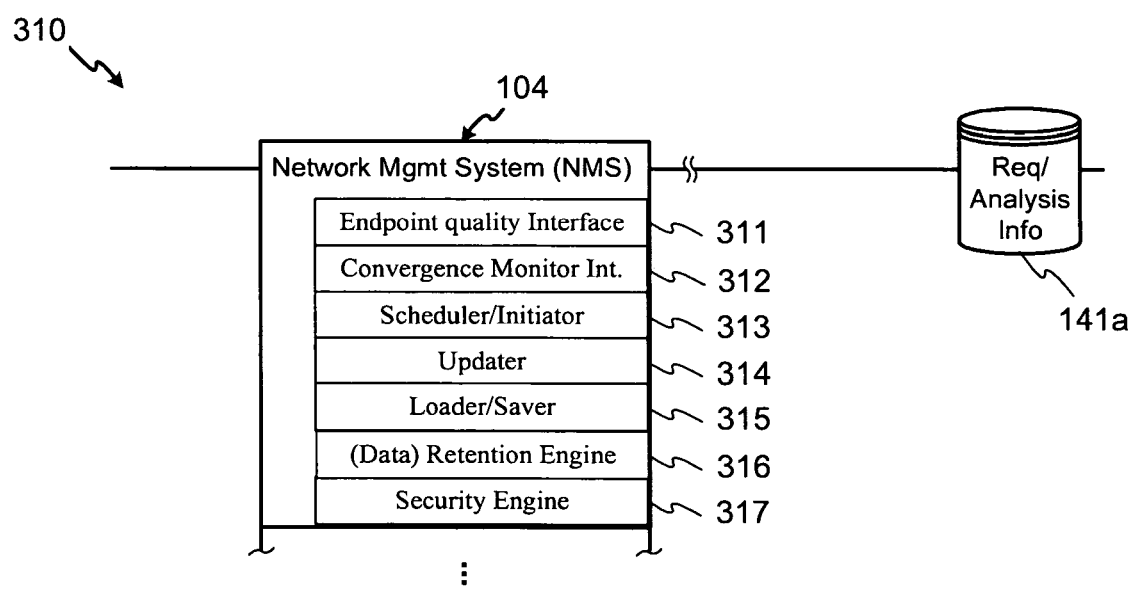
FIG. 3b is a flow diagram illustrating, in greater detail, an example of a network management system of FIGS. 1a and 1b, according to an embodiment of the invention.
Figure 3C:
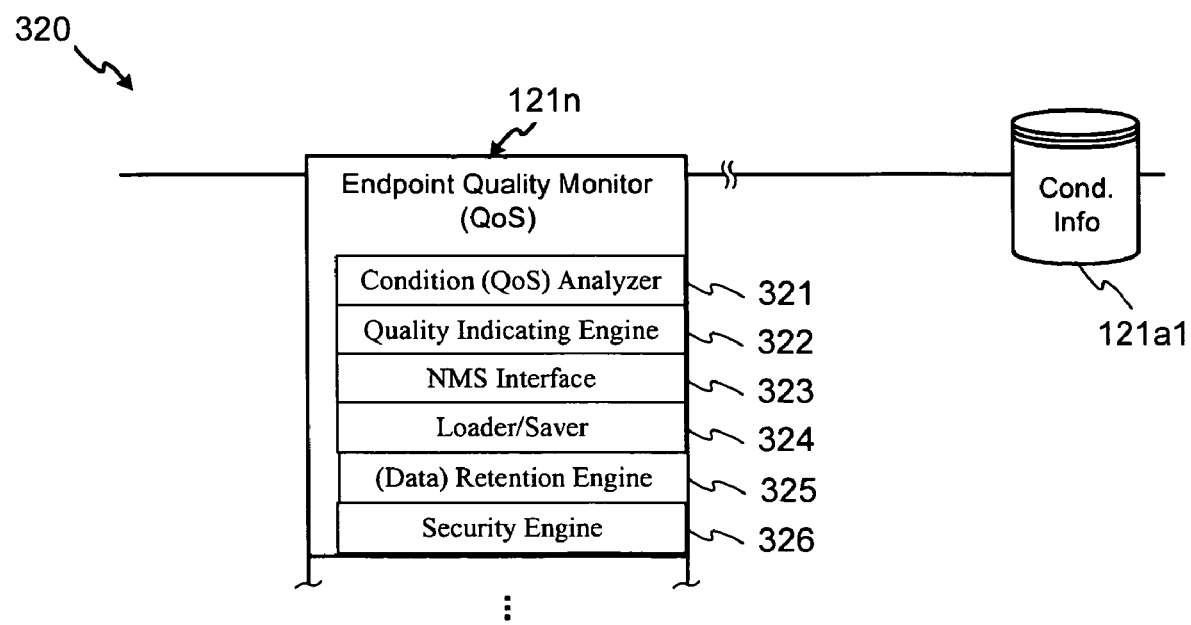
FIG. 3c is a flow diagram illustrating, in greater detail, an example of a endpoint condition detection instrument of FIGS. 1a and 1b, according to an embodiment of the invention.

The FIGS. 3A through 3C flow diagrams illustrate, in greater detail examples of monitoring system components of FIG. 1A through FIG. 2, according to embodiments of the invention.

Beginning with FIG. 3A, convergence monitor 122 includes a timing engine 301, interface engine 302, update monitor 303, update impact analyzer or correlation engine 304, loader/saver 305, data retention engine 306 and security engine 307. Timing engine 301 provides for determining an absolute or relative time corresponding to an instance of a network routing (convergence) change. Timing may, for example, correspond with an routing change start, duration, end, and so on, or some combination, and may correspond with an internal, derived, network or other suitable timing reference so long as a suitable time reference may be associated with routing change (or "update") instances that may occur. Timing engine 301 is operable for responding to a correlation monitoring request by returning a timing reference that update monitor may then associate with a current update.

Interface engine 302 provides for coupling convergence monitor 122 to other components (e.g., network manager 104) for enabling convergence monitor 122 control initiating correlation or other monitoring, and returning convergence or correlation monitoring results to a suitable monitoring results recipient (e.g., network manager 104.). Such interfacing may, for example, be conducted in an otherwise conventional manner for providing network component coupling and communication. Update monitor 303 provides for monitoring network routing (e.g., convergence) updates. Updates may, for example, be monitored by receiving status messages and timing information, and correspondingly updating a routing table (modified for maintaining a multiplicity of timed routing updates) maintained by convergence monitor 122.

Update impact analyzer (correlation engine) 304 provides for responding to a correlation monitoring request by conducting correlation analysis, for example, according to received criteria including at least one timing or other interaction indicator and at least one user device indicator of a user device corresponding to the interaction. For example, correlation engine 304 in one embodiment may receive, from an endpoint quality monitor via a network manager, an IP address or other first user device indicator. Correlation engine 304 may also receive, from a network manager, an IP address or other second user device indicator. Correlation engine 304 may further receive, from the endpoint quality monitor via a network manager or from the network manager, a time or delta time corresponding to a (detrimentally) modified quality condition. Correlation engine 304 may determine, from stored routing information, any routing changes that may have occurred at about the time of the modified quality condition, or may further determine a correlation of those routing changes that may have caused packet drops, delayed packets or other conditions that may have affected the quality.

Of the remaining convergence monitor components of the illustrated embodiment, loader/saver 305 provides for loading or storing routing or correlation information respectively. Data retention engine 306 provides for determining monitoring (e.g., monitored or correlated) information that may be deleted, and for initiating loader/saver 305 for deleting such information as needed. Data retention engine 306 addresses an issue that the amount of monitoring information may quickly become excessive to storage capacity or may include information that is no longer relevant or that is less relevant and may be deleted. A wide variety of mechanisms for selecting delete-able monitoring information may be used, including but not limited to first-in-first-out, priority interaction, devices, users or user classes, and so on, or some combination, and particular instance portions may be deleted in whole or part, according to the requirements of a particular implementation. Security engine 307 provides for limiting access to monitoring or correlation information maintained by convergence monitor 122, modification thereof or to correlation monitor 122 resources.

Continuing now with FIG. 3B, network management system (network manager) 104 includes endpoint quality interface 311, convergence monitor interface 312, scheduler/initiator 313, updater 314, loader/saver 315, retention engine 316 and security engine 317. Endpoint quality interface 311 provides in various embodiments for interfacing with and initiating or modifying endpoint quality monitor 121a, 121b operation (e.g., where such initiation or modification is not autonomously or otherwise provided), or receiving quality indicators that may be generated. Convergence monitor interface 312 similarly provides in various embodiments for initiating or modifying convergence monitor operation (e.g., where such initiation or modification is not autonomously or otherwise provided), forwarding information corresponding to indicators received from endpoint monitors 121a, 121b, and receiving convergence or correlation indicators from one or more convergence monitors.

Scheduler/initiator 313 provides, for example, in embodiments supporting endpoint quality monitor or convergence monitor initiation/modification, for determining when to conduct such initiation or modification. Scheduler/initiator may also provide, for example, in embodiments supporting network manager initiating correlation monitoring in conjunction with receipt of a quality condition detection indicator, for determining when to initiate correlation monitoring or returning of convergence or correlation information by one or more convergence monitors.

Updater 314 provides, in embodiments in which quality, convergence or correlation information is maintained by a network manager, for updating such information as may be stored by a network manager in accordance with information received from an endpoint quality monitor or convergence monitor. Updater 314 also provides, in embodiments in which network manager 104 provides for generating a timing indicator used in convergence monitor correlation, for generating a time or delta timing indicator corresponding to an endpoint monitor detected quality condition.

Loader/saver 315 provides for loading or storing quality, routing or correlation information (e.g., data, configuration, code, and so on) respectively. Data retention engine 316 is operable in a similar manner as with data retention engine 316 of convergence monitor 122 (FIG. 3A) for determining monitoring (e.g., monitored or correlated) information that may be deleted, and for initiating loader/saver 315 for deleting such information as needed. Security engine 317 is operable in a similar manner as with security engine 307 of convergence monitor 122 (FIG. 3A) for limiting access to monitoring or correlation information, modifying such information, or network manager 104 resources or control functions.

The FIG. 3C diagram illustrates how an exemplary endpoint quality monitor 121n includes condition analyzer 321, quality indicating engine (quality indicator) 322, network monitoring system interface 323, loader/saver 324, retention engine 325 and security engine 326. Condition analyzer 321 provides for analyzing an endpoint condition detected by endpoint quality monitor 121n in accordance with endpoint quality monitoring operations. As was already discussed, endpoint quality may be analyzed in various manners that may include but are not limited to K-factor, E-model, and so on, or some combination of quality determining mechanisms, many of which are becoming more widely utilized. Quality indicating engine 322 further provides for transferring an indicator of a determined quality condition to a convergence monitor or a network manager. NMS interface 323 provides for conducting such transfer, or further, for enabling a network manager (or other component) to provide for initiation or modification of endpoint quality monitor operation.

Loader/saver 324 is operable in a similar manner as with a network manager or convergence monitor and may, for example, provide for loading or saving endpoint quality monitoring information. Data retention engine 325 is operable in a similar manner as with data retention engine 316 of convergence monitor 122 (FIG. 3A) for determining monitoring (e.g., monitored or correlated) information that may be deleted, and for initiating loader/saver 315 for deleting such information as needed. (As was noted earlier, a scheduler or other components may also be included in accordance with the requirements of a particular implementation.) Security engine 326 is operable in a similar manner as with security engine 307 of convergence monitor 122 (FIG. 3A) for limiting access to monitoring information, modifying such information, or accessing endpoint quality monitor 121n resources.

Figure 4:
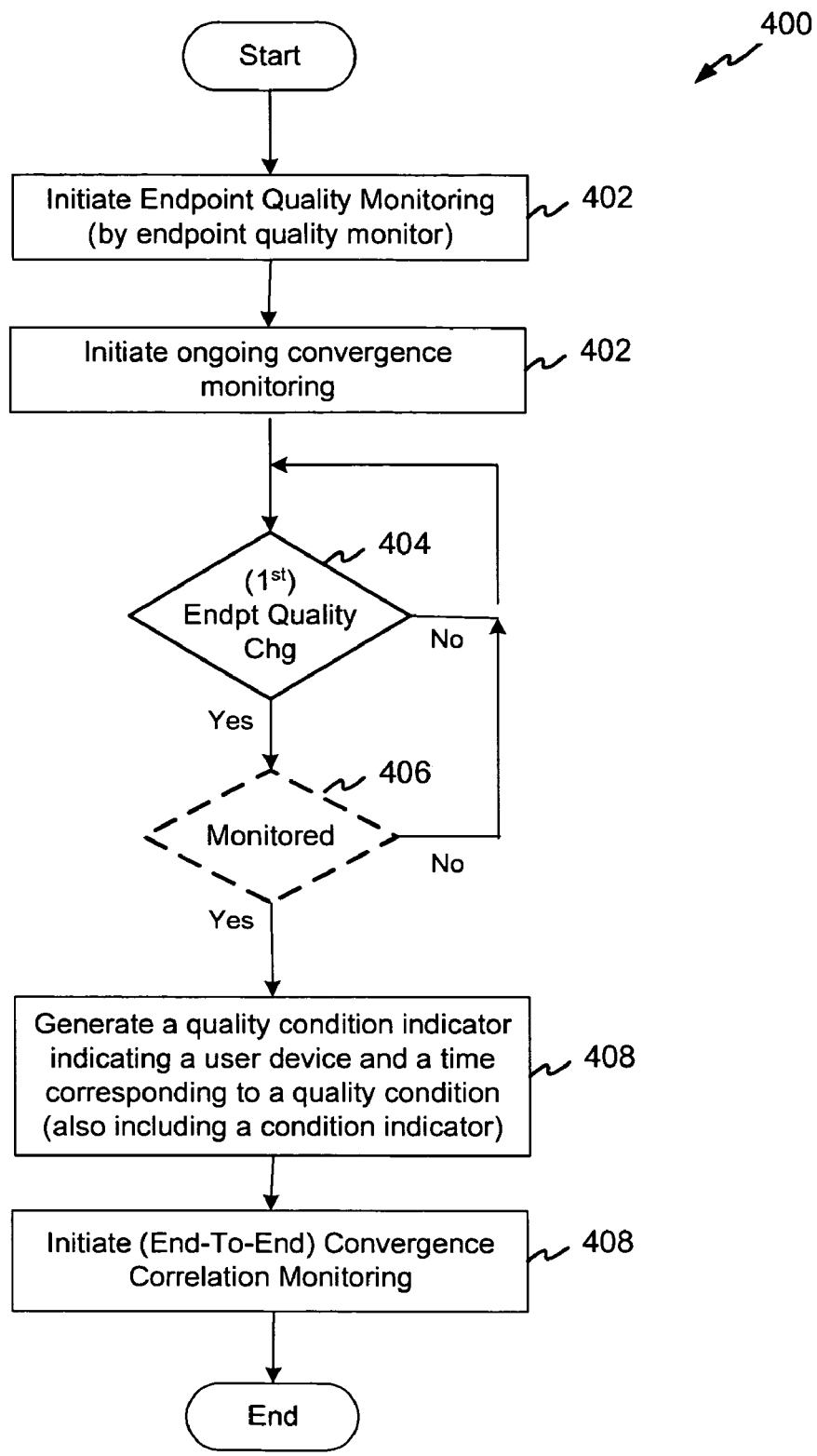
FIG. 4 is a flowchart illustrating a quality condition monitoring method employing convergence monitoring, according to an embodiment of the invention.
Figure 5:
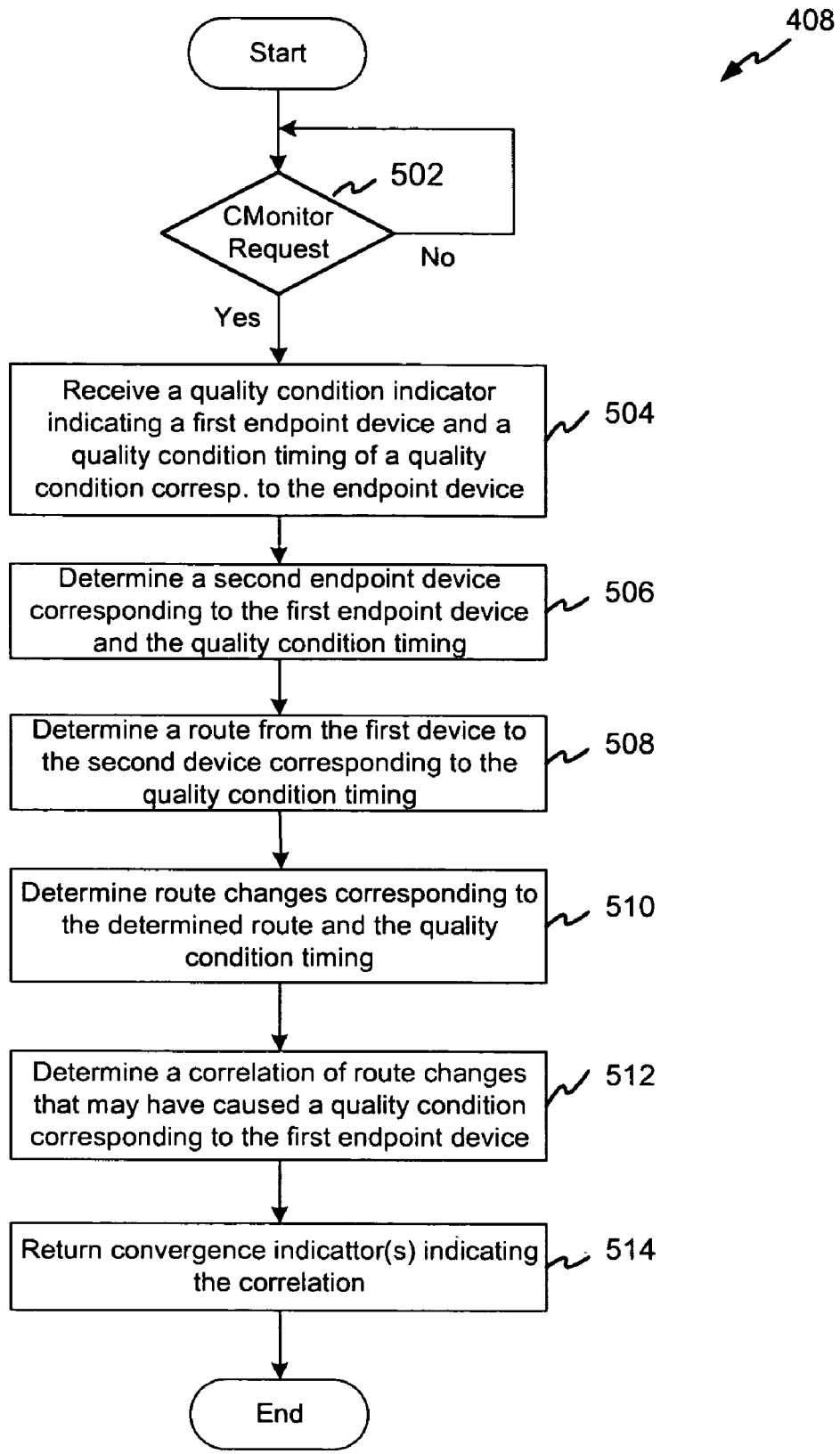
FIG. 5 is flowchart illustrating a convergence monitoring correlation method according to an embodiment of the invention.

The FIGS. 4 through 5 Flowcharts illustrate methods for conducting network-based quality monitoring that includes convergence monitoring, according to embodiments of the invention.

Beginning with FIG. 4, endpoint quality monitoring is initiated in block 402. The endpoint quality monitoring provides for determining a typically detrimental change in the quality of application presentation and may, for example, be conducted by an endpoint quality monitor during an ongoing IP-call, other phone call or other real-time or other network facilitated application. Ongoing convergence monitoring is further initiated in block 402. Ongoing convergence monitoring provides for determining and maintaining successive routing topologies of the network or a network portion and may, for example, include indicators of end-to-end routing changes (or resulting routing), affected devices and timing indicators indicating corresponding timing of the changes.

If, in block 404, an endpoint quality change is detected, then the method proceeds to block 406. In block 404, which may be performed in a more specific embodiment, the endpoint quality monitor determines whether the quality change is significant (to be monitored). The specific portion of quality changes to be monitored may vary considerably in accordance with the requirements of a particular implementation. For example, monitoring (or reporting) may include all quality changes, quality changes of one or more types, devices, users, applications, data types, and so on, or some combination thereof. If, in block 404, the quality change is to be monitored, then the method proceeds to block 408.

In block 408, the endpoint quality monitor generates a quality condition indicator. The quality condition indicator may, for example, indicate that a quality condition has occurred and the user device. The quality condition indicator may further indicate a timing corresponding to the occurrence of the quality condition, and may indicate a condition or condition type that occurred. (The timing indicator may also be generated by a network management service or network manager, for example, in conjunction with block 410. In block 410, the endpoint quality monitor causes convergence correlation monitoring to be initiated.

FIG. 5 illustrates an embodiment of the convergence correlation monitoring 408 of FIG. 4 in greater detail. Beginning with block 502, convergence correlation monitoring may be conducted on a request basis whereby the method continues in block 504 if a correlation monitoring request is received in block 502.

In block 504, a convergence monitor receives a quality condition indicator indicating a first endpoint device, e.g., a first user device, and a quality condition timing of a quality condition corresponding to the endpoint device (e.g., the condition indicated in block 404 of FIG. 4). In block 506, the convergence monitor determines a second endpoint device corresponding to the first endpoint device and the quality condition timing. A second endpoint device may, for example, include a second user device that is participating or has participated in a telephony application call or other interaction with the first endpoint device.

In block 508, the convergence monitor determines a route from the first device to the second device that corresponds to the quality condition timing. In other embodiments, the convergence monitor or a coupled device may monitor occurrences of application interactions or addition timing to identify a particular interaction between the two (or more) endpoint devices during which a quality condition occurred. For example, voice, other audio, video or other data may be identifiable within data packets transferred from or between devices. An network manager or application service host may also monitor and provide to a convergence monitor one or more indicators indicating each interaction, particularly where the interaction is facilitated by an application service host. An initial, end, duration or other timing, or some combination may also be provided to a convergence monitor to identify the interaction or an interaction portion. A predetermined or otherwise determinable delta time extended particularly backward from a quality condition may also identify an interaction or interaction portion, or some combination of these or other mechanisms may also be used. A route that couples endpoint devices during the interaction, or further at about the time of the quality condition may then be determined as an active route between the devices. (Typically, only one active route will be provided, although more than one route may also be determined in a similar manner.

In block 510, the convergence monitor determines route changes corresponding to the route determined to couple the endpoint devices and the quality condition timing. Route changes may, for example, be determined by polling a routing change tracking routing table maintained by the convergence monitor (e.g., see above). Applicable routing changes may further be determined as those routing changes to the route coupling the endpoint devices that may occur, extending from the beginning of the interaction, about the time and prior to the quality condition or at other times that may be predetermined or otherwise determinable or some combination of times.

In block 512, the convergence monitor determines a correlation of one or more route changes (if any) that may have caused a quality condition corresponding to the first endpoint device. It will be appreciated that the quality condition in this case may or may not be limited to the quality condition as indicated by the indicator(s) received by the convergence monitor, and may include other potential conditions that may be identifiable by reference to route changes. (See FIG. 6.)

In block 514, the convergence monitor may return one or more correlation indicators to a requesting or other indicated or predetermined device, or some combination thereof.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A network monitoring method, comprising:
    performing, by an endpoint quality monitor, quality monitoring of a user device that is coupled to a network for conducting an application;
    determining, by the endpoint quality monitor, that a quality condition affecting the user device has occurred;
    transferring, by the endpoint quality monitor, a quality indicator indicating the occurrence of the quality condition;
    receiving, by a convergence monitor, the quality indicator and a timing indicator indicating a timing of the condition occurrence; and
    determining, by the convergence monitor in accordance with the received indicators, one or more network routing changes that may have caused the quality condition affecting the user device.

2. A network monitoring method according to claim 1, wherein the application includes at least one of a telephony application and a video conferencing application.

3. A network monitoring method according to claim 1, wherein the quality condition includes a reduced quality of voice (QoV).

4. A network monitoring method according to claim 1, wherein the endpoint condition indicator corresponds to at least one of a K-factor analysis and an E-model quality of voice analysis.

5. A network monitoring method according to claim 1, wherein the convergence monitor comprises a passive router.

6. A network monitoring method according to claim 1, wherein the determining by the convergence monitor includes determining a second user device with which the user device is conducting the application when the quality condition is determined to have occurred.

7. A network monitoring method according to claim 1, wherein the determining by the convergence monitor includes determining whether one or more routing changes is likely to have caused at least one of dropped data packets and delayed data packets.

8. A network monitoring method according to claim 1, wherein the endpoint quality monitor transfers the quality indicator to at least one of a network management system and an application service host that determines the timing indicator and transfers the quality indicator and the timing indicator to the convergence monitor.

9. A network monitoring method according to claim 1, further comprising:
    forming, by the convergence monitor, a topology routing map;
    monitoring, by the convergence monitor, routing changes affecting a network portion; and
    storing, by the convergence monitor in the topology map, monitored routing change indicators and routing change timing indicators corresponding to routing changes occurring in the network portion.

10. A network monitoring system, comprising
    means for performing quality monitoring of a user device that is coupled to a network for conducting an application;
    means for determining that a quality condition affecting the user device has occurred;
    means for transferring a quality indicator indicating the occurrence of the quality condition;
    means for receiving the quality indicator and a timing indicator indicating a timing of the condition occurrence; and
    means for determining, in accordance with the received indicators, one or more network routing changes that may have caused the quality condition affecting the user device.

11. A machine-readable medium having stored thereon instructions that when executed cause a computer to perform the steps of:
    performing quality monitoring of a user device that is coupled to a network for conducting an application;
    determining that a quality condition affecting the user device has occurred; and
    transferring, to an end-to-end convergence monitor, a quality indicator indicating the occurrence of the quality condition and a timing indicator indicating a timing of the condition occurrence.

12. A network monitoring method, comprising:
    monitoring network routing changes occurring in a network portion;

storing the monitoring routing changes and a change timing indicators corresponding to the routing changes;

receiving a quality indicator indicating a quality condition affecting a first endpoint device and a quality timing indicator indicating a timing of the quality condition, the first endpoint device conducting an interaction application with a second endpoint device via the network portion; and determining one or more routing changes to a network route coupling the first and second endpoint devices that may have caused the quality condition.

13. A network monitoring method according to claim 12, wherein the application includes at least one of a telephony application and a video conferencing application.

14. A network monitoring method according to claim 12, wherein the quality condition includes a reduced quality of voice (QoV).

15. A network monitoring method according to claim 12 wherein the quality condition is determined according to at least one of K-factor and E-model analysis.

16. A network monitoring method according to claim 12, wherein the method is performed by a passive router.

17. A method according to claim 12, wherein the quality indicator is received from an endpoint quality monitor corresponding to the first endpoint device, and the timing indicator is received from at least one of the endpoint quality monitor and a network management service.

18. A method according to claim 12, further comprising:
determining the second endpoint device;
determining the network route; and
determining routing changes corresponding to the network route.

19. A network monitoring system, comprising:
means for monitoring network routing changes occurring in a network portion;

means for storing the monitoring routing changes and a change timing indicators corresponding to the routing changes;

means for receiving a quality indicator indicating a quality condition affecting a first endpoint device and a quality timing indicator indicating a timing of the quality condition, the first endpoint device conducting an interaction application with a second endpoint device via the network portion; and means for determining one or more routing changes to a network route coupling the first and second endpoint devices that may have caused the quality condition.

20. A machine-readable medium having stored thereon instructions that when executed cause a computer to perform the steps of:
monitoring network routing changes occurring in a network portion;

storing the monitoring routing changes and a change timing indicators corresponding to the routing changes;

receiving a quality indicator indicating a quality condition affecting a first endpoint device and a quality timing indicator indicating a timing of the quality condition, the first endpoint device conducting an interaction application with a second endpoint device via the network portion; and determining one or more routing changes to a network route coupling the first and second endpoint devices that may have caused the quality condition.

* * * * *

UNITED STATES PATENT AND TRADEMARK OFFICE
CERTIFICATE OF CORRECTION

PATENT NO.        : 7,627,290 B2                                             Page 1 of 1
APPLICATION NO. : 11/176631
DATED             : December 1, 2009
INVENTOR(S)       : Wing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this

Twenty-first Day of December, 2010

David J. Kappos
*Director of the United States Patent and Trademark Office*